United States Patent [19]
Farkye et al.

[11] Patent Number: 5,573,806
[45] Date of Patent: Nov. 12, 1996

[54] CALIFORNIA COOKING CHEESE

[75] Inventors: Nana Y. Farkye; B. Bhanu Prasad, both of San Luis Obispo, Calif.

[73] Assignee: California Polytechnic State University Foundation, San Luis Obispo, Calif.

[21] Appl. No.: 514,559

[22] Filed: Aug. 14, 1995

Related U.S. Application Data

[63] Continuation-in-part of Ser. No. 152,457, Nov. 12, 1993, Pat. No. 5,445,845.

[51] Int. Cl.$^6$ ................................................. A23C 19/045
[52] U.S. Cl. ............................ 426/582; 426/74; 426/522
[58] Field of Search ................................. 426/582, 522, 426/74

[56] References Cited

U.S. PATENT DOCUMENTS 4,885,183  12/1989  Strandholm et al. ............... 426/582
5,356,640  10/1994  Jameson et al. .................... 426/582

*Primary Examiner*—Helen Pratt
*Attorney, Agent, or Firm*—Gerstman, Ellis & McMillin, Ltd.

[57] ABSTRACT

A heat-stable cheese is provided which comprises about 48–55% moisture, about 20-22% protein, about 300–600 milligrams calcium per 100 grams cheese, about 18–21% fat and having a pH of about 5.1–5.5. The cheese will not melt at temperatures below about 400° F. It can be colored, flavored or both.

14 Claims, No Drawings

CALIFORNIA COOKING CHEESE

The application is a continuation-in-part of U.S. patent application Ser. No. 08/152,457 filed on Nov. 12, 1993; now, U.S. Pat. No. 5,445,845.

FIELD OF THE INVENTION

The present invention concerns a novel heat-stable, melt-resistant cheese.

BACKGROUND OF THE INVENTION

Queso Blanco (white cheese) is the generic name for many fresh, white semi-soft cheeses produced in several parts of Latin America. The cheeses differ from each other by method of production (i.e., coagulation by acid/heat or rennet). Examples include Queso de Cincho, Queso del Pais and Queso Llanero. In other parts of the world, similar cheeses include Chhana and Paneer in India, Armavir in Western Caucasus, Zsirpi in the Himalayas and Beli sir types in the Balkans.

Cheese and process cheese products are known which exhibit heat stability. However, such cheese products are quite different from the cheese of the present invention. Ricotta cheese is used in baking and is heat-stable. But, it cannot be formed into blocks and cut, sliced and diced like the cheese of the present invention.

Process cheese products which are made by mixing and heating one or more cheese with emulsifying agents and other optional ingredients can be made heat stable. However, these process cheese products do not have the natural cheese flavor and other favorable attributes of natural cheese. Thus, these process cheese products are not considered to be "real" cheese.

An object of the present invention is to provide a new heat-stable, soft to semi-soft white cheese.

Another object of the present invention is to provide a cheese which is flavored and/or colored. Flavoring agents can be added to the organic acid used to form the curd or can be added after the curd is formed. Cheese colorant, e.g. annatto, may be added to give the cheese desired color.

Another object of the present invention is to provide a cheese which has unique functional properties which makes it suitable for use as an ingredient in a variety of foods. The conditions of manufacture limit the growth of pathogenic organisms. The cheese has long refrigerated shelf-life and excellent melt resistance. The cheese can withstand high-temperature processing conditions found in boiling, deep-fat frying, pan frying, sterilization, retort/canning, extrusion cooking, microwave heating, baking, etc., without oiling off or deformation (melting).

Some of the food applications include use in curry (stews), soups, sauces and casseroles. It can be used as a filling in ravioli and other pasta products. It can be mixed with cereals and extruded as a puffed nutritious snack food. It can be used in deep-fried foods and extruded cheese snacks. It can be mixed with dried fruits, rolled oats, nuts, and honey or syrup, then baked to produce granola or granola bars. It can also be blended with meats to produce sausages. It can be used to replace tofu in oriental dishes. It can be diced and added to microwaveable instant noodles to enhance their nutritional value. The good sliceability of the cheese makes it well-suited for use in salads. It can be used in salad dressings.

Other objects and advantages of the present invention will become apparent as the description proceeds.

SUMMARY OF THE INVENTION

The present invention provides a cheese comprising about 48–55% moisture, about 20–22% protein, about 300–600 milligrams calcium per 100 grams cheese, about 18–21% fat and having a pH of about 5.1–5.5. In certain illustrative embodiments, the cheese has 51–53% moisture, 19–21% fat and a pH of about 5.2.

A cheese made in accordance with the present invention can withstand high-temperature processing conditions found in frying, boiling microwave heating, baking, retort processing, etc., without oiling off or deformation (melting). The cheese is heat-stable at temperatures at least as high as about 400° F. The cheese can be colored, flavored or both.

A more detailed explanation of the invention is provided in the following description and claims.

DETAILED DESCRIPTION OF THE ILLUSTRATIVE EMBODIMENT

The cheese is preferably made from raw or pasteurized (72° C. for 16 seconds) milk containing about 3% fat although milk containing zero to 3.5% fat may be used. The milk may or may not be homogenized before cheese manufacture. The pH of the milk may be adjusted to 7.5 in order to reduce the formation of milkstone, film or burn-on on the vat. Anhydrous calcium chloride is added to the milk at the rate of 0.02% (wt./wt.). The calcium chloride is dissolved in a small volume of water before adding to the milk. Liquid calcium chloride may be used instead of the dry product. Cheese colorant, e.g., annatto, may be added to give the cheese desired color.

The milk is slowly heated indirectly (by steam injection) in a water-jacketed vat at the rate of about 1.3° C. (2.3° F.) per minute to about 80°–95° C., but preferably to about 85° C. (185° F.), and held there for about 10–60 minutes, preferably about 30 minutes. A 2% solution of food-grade organic acid, (e.g., acetic, citric, malic or lactic acid or blends thereof) at a temperature of 55°–80° C., preferably about 79° C. (175° F.) is slowly and uniformly added with mild agitation to reduce the pH to 5.0 to 4.2, preferably about 4.4, to form a curd. The volume of acid required to make this pH adjustment depends on the type of acid and the initial pH of the milk. The acidogen, glucono-delta-lactone (GDL), may also be used.

The curd-whey mixture is held at 73°–75° C. (165°–167° F.), for about 10 minutes under quiescent conditions (with the vat covered) to allow the curd to form agglomerates and to settle to the bottom of the vat. The whey is drained through a strainer while the hot water in the jacket of the vat is simultaneously drained. After most of the whey is removed, the curd is trenched to facilitate complete whey removal. The curd is cooled by circulating cold water through the jacket.

While the curd is at a temperature of between 50° and 70° C., salt (NaCl) is added to the curd at the rate of 2% wt./wt. of curd. The salt is stirred into the curd in three equal applications. At this stage, the curd ceases to expel whey. The salted curd is hooped into stainless steel hoops and pressed for about 30–40 minutes at about 40 psi. After pressing, the hoop is transferred to a freezer at −7° to −10° C. (19°–14° F.) for 30 minutes to 2 hours or until the curd temperature drops to about 26° C. (80° F.). From the freezer, it is transferred to a cold room at 7–°10° C. (45°–50° F.)

where it is held overnight. Then, the cheese is removed from the hoop and vacuum-packaged.

The yield of the cheese is about 13.5% (at 50% moisture basis). The composition of the cheese formed is: moisture, 48–55%; protein, 20–22%; fat, 18–21% and pH, 5.1–5.5. The calcium content ranged from 348 to 587 milligrams calcium per 100 grams cheese (mg %) as determined by atomic absorption spectrophotometric methods (Official Methods of Analysis, AOAC 1990. Methods 965.09, 968.08 and 985.35). The cheese produced has a mild flavor, excellent sliceability, melt resistant and remains fresh for at least 9 weeks of refrigerated storage.

The cheeses described herein have a calcium content which is intermediate of cheeses made by direct acidification which generally have a calcium content of less than 100 mg % and rennet coagulated cheese which generally have a calcium content of greater than 700 mg %. Among the cheeses made by direct acidification are such cheeses as cottage cheese which is reported to have a calcium level of about 73 mg %, cream cheese which is reported to have a calcium level of 100 mg % and ricotta cheese (made from whole milk) which is reported to have a calcium level of 200 mg %. Among the rennet coagulated cheeses are such cheeses as cheddar cheese which is reported to have a calcium level of 740 mg % and Edam cheese which is reported to have a calcium level of 770 mg %.

EXAMPLE I

Eighty-one pounds (36.8 kilograms, kg) of milk (containing 3.5% fat, 3.38% protein, and 12.30% total solids, and having pH 6.7), was weighed into a 30-gallon capacity stainless steel, water-jacketed vat. Calcium chloride (9.57 grams, g) was dissolved in about 20 milliliters (mL) water and stirred into the milk. The jacket was filled with cold water to approximately the same level of milk in the vat. Steam was slowly injected into the jacket to raise the temperature of the milk to 85° C. (185° F.) over one hour. Table 1 illustrates the incremental heating scheme:

TABLE 1

Heating scheme of milk.

| Time (min) | Temperature |
| --- | --- |
| 0.00 | 15.5° C. (60° F.) |
| 10.00 | 32.2° C. (90° F.) |
| 20.00 | 51.6° C. (125° F.) |
| 30.00 | 65.6° C. (150° F.) |
| 40.00 | 73.8° C. (165° F.) |
| 50.00 | 79.4° C. (175° F.) |
| 60.00 | 85.0° C. (185° F.) |
| 90.00 | 85.0° C. (185° F.) |

The milk was held at 85° C. (185° F.) for 30 minutes. Then, 4.5 liters of a 2% solution of acetic acid (prepared by adding 200 mL of food-grade glacial acetic acid to approximately 10 liters of hot water) at about 79.4° C. (175° F.)) were slowly added to the hot milk with mild agitation. The pH of the curd-whey mixture in the vat was 4.4. Visible coagulation of the milk occurred at a pH of about 4.9. The process of acid addition was completed within 10 minutes. The temperature of the curd-whey mixture in the vat at this stage was about 73°–75° C. (165°–167° F.) where it was held for about 10 minutes under quiescent conditions, with the vat covered. Then, the vat was uncovered and a strainer was placed into the drain opening, and the valve was opened to drain whey. Simultaneously, the hot water in the jacket was drained. After draining of most of the whey, the curd was trenched for complete whey removal. It took about 15 minutes for complete whey drainage. Cold city water was circulated through the jacket to cool the curd. Salt (99.4 g) was then mixed into the curd in three applications (about 33 g per application) at time intervals of about 3–4 minutes between applications. At the initial application of salt, the curd ceased to expel whey. The salted curd was hooped into 10-lb Wilson-style stainless steel hoops and pressed at 40 psi in a horizontal hydraulic press for 30 minutes. The hoop was removed from the press and placed in a freezer at −7° to −10° C. (19°–14° F.) for 2 hours to rapidly cool the curd to about 27° C. (80° F.). From the freezer, the hoop was placed in a cold room maintained at 7° C. (45° F.) where it was kept overnight. Then the cheese was removed from the hoop, vacuum-packaged and stored at 7° C. (45° F.) for consumption. Table 2 shows the yield and composition of cheese.

TABLE 2

Composition of cheese made with acetic acid.

| Component | Cheese |
| --- | --- |
| Moisture | 51.52% |
| Protein | 21.28% |
| Fat | 20.5% |
| Salt | 1.91% |
| pH | 5.32 |
| Yield | 13.58% |

The whey tested 5.68% total solids and 0.27% protein (Kjeldahl nitrogen×6.38).

EXAMPLE II

Eighty-five pounds (38.6 kg) of 3.5% fat milk, pH 6.7, was weighed into a 30-gallon capacity stainless steel, water-jacketed vat. Calcium chloride (9.92 g) was dissolved in about 20 milliliters water and stirred into the milk. The jacket was filled with cold water to approximately the level of milk in the vat. Steam was slowly injected into the jacket to raise the temperature of the milk to 85° C. (185° F.) over one hour as illustrated in Table 1.

The milk was held at 85° C. (185° F.) for 30 minutes. Then, 4.5 liters of a 2% solution of citric acid (prepared by adding 200 grams of food-grade citric acid to approximately 10 liters of hot water) at about 79.4° C. (175° F.)) were slowly added to the hot milk with mild agitation. The pH of the curd-whey mixture in the vat was 4.4. Visible coagulation of the milk occurred at a pH of about 4.9. The process of acid addition was completed within 10 minutes. The temperature of the curd-whey mixture in the vat at this stage was about 73°–75° C. (165°–167° F.) where it was held for about 10 minutes under quiescent conditions, with the vat covered. Then, the vat was uncovered and a strainer was placed into the drain opening and the valve was opened to drain whey. Simultaneously, the hot water in the jacket was drained. After draining of most of the whey, the curd was trenched for complete whey removal. It took about 15 minutes for complete whey drainage. Cold city water was circulated through the jacket to cool the curd. Salt (104.3 g) was then mixed into the curd in three applications (about 34.7 g per application) at time intervals of about 3–4 minutes between applications. At the initial application of salt, the curd ceased to expel whey. The salted curd was hooped into 10-lb Wilson-style stainless steel hoops and pressed at 40 psi in a horizontal hydraulic press for 30 minutes. The hoop was removed from the press and placed in a freezer at −7° to −10° C. (19°–14° F.) for 2 hours to rapidly cool the curd to about 27° C. (80° F.). From the freezer, the hoop was placed in a cold room maintained at 7° C. (45° F.) where it was kept overnight. The cheese was removed from the hoop, vacuum-packaged and stored at 7° C. (45° F.) for consumption. Table 3 shows the composition and yield of the cheese.

TABLE 3

Composition of cheese made with citric acid.

| Component | Cheese |
| --- | --- |
| Moisture | 51.21% |
| Protein | 20.44% |
| Fat | 20.0% |
| Salt | 1.88% |
| pH | 5.28 |
| Yield | 13.75% |

The whey contained 5.81% total solids and 0.28% protein (Kjeldahl nitrogen×6.38).

EXAMPLE III

Eighty-six pounds (39 kg) of 3.5% fat milk, pH 6.7, was weighed into a 30-gallon capacity stainless steel, water-jacketed vat. Calcium chloride (10.16 g) was dissolved in about 20 mL water and stirred into the milk. The jacket was filled with cold water to approximately the same level of milk in the vat. Steam was slowly injected into the jacket to raise the temperature of the milk to 85° C. (185° F.) over one hour as illustrated in Table 1.

The milk was held at 85° C. (185° F.) for 30 minutes. Then, 5.5 liters of a 2% solution of lactic acid (prepared by adding 230 mL of 85% food-grade lactic acid to approximately 10 liters of hot water) at about 79.4° C. (175° F.)) were slowly added to the hot milk with mild agitation. The pH of the curd-whey mixture in the vat was 4.4. Visible coagulation of the milk occurred at a pH of about 4.9. The process of acid addition was completed within 10 minutes. The temperature of the curd-whey mixture in the vat at this stage was about 73°–75° C. (165°–167° F.) where it was held for about 10 minutes under quiescent conditions, with the vat covered. Then, the vat was uncovered and a strainer was placed into the drain opening, and the valve was opened to drain whey. Simultaneously, the hot water in the jacket was drained. After draining of most of the whey, the curd was trenched for complete whey removal. It took about 20 minutes for complete whey drainage. Cold city water was circulated through the jacket to cool the curd. Salt (105.5 g) was then mixed into the curd in three applications (about 35.1 g per application) at time intervals of about 3–4 minutes between applications. At the initial application of salt, the curd ceased to expel whey. The salted curd was hooped into 10-lb Wilson-style stainless steel hoops and pressed at 40 psi in a horizontal hydraulic press for 30 minutes. The hoop was removed from the press and placed in a freezer at −7° to −10° C. (19°–14° F.) for 2 hours to rapidly cool the curd to about 27° C. (80° F.). From the freezer the hoop was placed in a cold room maintained at 7° C. (45° F.) where it was kept overnight. Then the cheese was removed from the hoop, vacuum-packaged and stored at 7° C. (45° F.) for consumption. Table 4 shows the composition and yield of the cheese.

TABLE 4

Composition of cheese made with lactic acid.

| Component | Cheese |
| --- | --- |
| Moisture | 53.77% |
| Protein | 19.70% |
| Fat | 18.5% |
| Salt | 1.81% |
| pH | 5.28 |
| Yield | 14.0% |

The whey contained 6.36% total solids and 0.31% protein (Kjeldahl nitrogen ×6.38).

EXAMPLE IV

The pH of 137 pounds (62.2 kg) of 3.5% fat milk was adjusted to 7.5 by stirring in about 66 mL of 25% NaOH. The alkalinized milk was held overnight at 4° C. (39° F.). Then the milk was transferred into a 30-gallon capacity stainless steel, water-jacketed vat. Calcium chloride (16.2 g) was dissolved in about 50 mL water and stirred into the milk. The jacket was filled with cold water to approximately the same level of milk in the vat. Steam was slowly injected into the jacket to raise the temperature of the milk to 85° C. (185° F.) over one hour as illustrated in Table 1.

The milk was held at 85° C. (185° F.) for 30 minutes. Then, 8.6 liters of a 2% solution of citric acid (prepared by adding 200 g of food-grade citric acid to approximately 10 liters of hot water) at about 79.4° C. (175° F.)) were slowly added to the hot milk with mild agitation. The pH of the curd-whey mixture in the vat was 4.4. Visible coagulation of the milk occurred at a pH of about 4.9. The process of acid addition was completed within 10 minutes. The temperature of the curd-whey mixture in the vat at this stage was about 73°–75° C. (165°–167° F.) where it was held for about 10 minutes under quiescent conditions with the vat covered. Then, the vat was uncovered and a strainer was placed into the drain opening, and the valve was opened to drain whey. Simultaneously, the hot water in the jacket was drained. After draining of most of the whey, the curd was trenched for complete whey removal. It took about 20 minutes for complete whey drainage. Cold city water was circulated through the jacket to cool the curd. Salt (161 g) was then mixed into the curd in three applications (about 53 g per application) at time intervals of about 3–4 minutes between applications. At the initial application of salt, the curd ceased to expel whey. The salted curd was hooped into 20-lb Wilson-style stainless steel hoops and pressed at 40 psi in a horizontal hydraulic press for 30 minutes. The hoop was removed from the press and placed in a freezer at −7° to −10° C. (19°–14° F.) for 2 hours to rapidly cool the curd to about 27° C. (80° F.). From the freezer, the hoop was placed in a cold room maintained at 7° C. (45° F.) where it was kept overnight. Then the cheese was removed from the hoop, vacuum-packaged and stored at 7° C. (45° F.) for consumption. Table 5 shows the composition and yield of the cheese.

TABLE 5

Composition of cheese made with citric acid.

| Component | Cheese |
| --- | --- |
| Moisture | 52.58% |
| Protein | 23.00% |
| Fat | 20.0% |

TABLE 5-continued

Composition of cheese made with citric acid.

| Component | Cheese |
| --- | --- |
| Salt | 2.0% |
| pH | 5.21 |
| Yield | 12.84% |

EXAMPLE V

The pH of 106 pounds (48.12 kg) of 3.5% fat milk was adjusted to 7.5 by stirring in about 54 mL of 25% NaOH. The alkalinized milk was held overnight at 4° C. (39° F.). Then the milk was transferred into a 30-gallon capacity stainless steel, water-jacketed vat. Calcium chloride (12.5 g) was dissolved in about 40 mL water and stirred into the milk. The jacket was filled with cold water to approximately the same level of milk in the vat. Steam was slowly injected into the jacket to raise the temperature of the milk to 85° C. (185° F.) over one hour as illustrated in Table 1.

The milk was held at 85° C. (185° F.) for 30 minutes. Then, 8.5 liters of a 2% solution of malic acid (prepared by adding 200 g of food-grade malic acid to approximately 10 liters of hot water) at about 79.4% ° C. (175° F.)) were slowly added to the hot milk with mild agitation. The pH of the curd-whey mixture in the vat was 4.4. Visible coagulation of the milk occurred at pH of about 4.9. The process of acid addition was completed within 10 minutes. The temperature of the curd-whey mixture in the vat at this stage was about 73°–75° C. (165°–167° F.) where it was held for about 10 minutes under quiescent conditions, with the vat covered. Then, the vat was uncovered and a strainer was placed into the drain opening, and the valve was opened to drain whey. Simultaneously, the hot water in the jacket was drained. After draining of most of the whey, the curd was trenched for complete whey removal. It took about 20 minutes for complete whey drainage. Cold city water was circulated through the jacket to cool the curd. Salt (125.2 g) was then mixed into the curd in three applications (about 41.7 g per application) at time intervals of about 3–4 minutes between applications. At the initial application of salt, the curd ceased to expel whey. The salted curd was hooped into 20-lb Wilson-style stainless steel hoops and pressed at 40 psi in a horizontal hydraulic press for 30 minutes. The hoop was removed from the press and placed in a freezer at −7° to −10° C. (19°–14° F.) for 2 hours to rapidly cool the curd to about 27° C. (80° F.). From the freezer the hoop was placed in a cold room maintained at 7° C. (45° F.) where it was kept overnight. Then the cheese was removed from the hoop, vacuum-packaged and stored at 7° C. (45° F.) for consumption. Table 6 shows the composition and yield of the cheese.

TABLE 6

Composition of cheese made with malic acid.

| Component | Cheese |
| --- | --- |
| Moisture | 49.56% |
| Protein | 21.76% |
| Fat | 20.5% |
| Salt | 1.96% |
| pH | 5.21 |
| Yield | 13.69 |

EXAMPLE VI

Two hundred and twenty-seven pounds (103.3 kg) of 3.5% fat milk, pH 6.7, was weighed into a 100-gallon capacity stainless steel, water-jacketed vat. Calcium chloride (26.8 g) was dissolved in about 50 mL water and stirred into the milk. The jacket was filled with cold water to approximately the same level of milk in the vat. Steam was slowly injected into the jacket to raise the temperature of the milk to 85° C. (185° F.) over one hour as illustrated in Table 1.

The milk was held at 85° C. (185° F.) for 30 minutes. Then, 9.75 liters of a 2% solution of equal quantities of malic and acetic acid (prepared by adding 100 g of food-grade malic acid plus 100 mL food-grade glacial acetic acid to approximately 100 liters of hot water) at about 79.4° C. (175° F.)) were slowly added to the hot milk with mild agitation. The pH of the curd-whey mixture in the vat was 4.4. Visible coagulation of the milk occurred at pH of about 4.9. The process of acid addition was completed within 10 minutes. The temperature of the curd-whey mixture in the vat at this stage was about 73°–75° C. (165°–167° F.) where it was held for about 10 minutes under quiescent conditions, with the vat covered. Then, the vat was uncovered and a strainer was placed into the drain opening, and the valve was opened to drain whey. Simultaneously, the hot water in the jacket was drained. After draining of most of the whey, the curd was trenched for complete whey removal. It took about 15 minutes for complete whey drainage. Cold city water was circulated through the jacket to cool the curd. Salt (278 g) was then mixed into the curd in three applications (about 93 g per application) at time intervals of about 3–4 minutes between applications. At the initial application of salt, the curd ceased to expel whey. The salted curd was hooped into 10-lb Wilson-style stainless steel hoops and pressed at 40 psi in a horizontal hydraulic press for 30 minutes. The hoops were removed from the press and placed in a freezer at −7° to −10° C. (19°–14° F.) for 2 hours to rapidly cool the curd to about 27° C. (80° F.). From the freezer the hoop was placed in a cold room maintained at 7° C. (45° F.) where it was kept overnight. The cheese was removed from the hoops, vacuum-packaged and stored at 7° C. (45° F.) for consumption. Table 7 shows the composition and yield of the cheese.

TABLE 7

Composition of cheese made with malic/acetic acid blend.

| Component | Cheese |
| --- | --- |
| Moisture | 51.85% |
| Protein | 21.86% |
| Fat | 21.0% |
| Salt | 1.98% |
| pH | 5.30 |
| Yield | 13.60 |

The whey contained 5.64% total solids

EXAMPLE VII

This example illustrates cheese making from non-homogenized milk. One hundred and sixty-two pounds (73.5 kilograms, kg) of milk (containing 3.0% fat, 3.5% protein, and 12.40% total solids, and having pH 6.7), was weighed into a 50-gallon capacity stainless steel, water-jacketed vat. Calcium chloride (19.14 grams, g) was dissolved in about 40 milliliters (mL) hot (200° F.) distilled water and stirred into the milk. The jacket was filled with cold water to approximately the same level of milk in the vat. Steam (at 15 to 20 psi) was slowly injected into the jacket to raise the temperature of the milk to 85° C. over one hour. Table 8 illustrates the incremental heating scheme.

TABLE 8

Heating scheme of milk.

| Time (min) | Temperature |
| --- | --- |
| 0.00 | 15.5° C. (60° F.) |
| 10.00 | 32.2° C. (90° F.) |
| 20.00 | 51.6° C. (125° F.) |
| 30.00 | 65.6° C. (150° F.) |
| 40.00 | 73.8° C. (165° F.) |
| 50.00 | 79.4° C. (175° F.) |
| 60.00 | 85.0° C. (185° F.) |
| 90.00 | 85.0° C. (185° F.) |

The milk was held at 85° C. (185° F.) for 30 minutes. Then, 11 liters of a 2% solution of acetic acid (prepared by adding 582.5 mL of food-grade acetic acid (300 grain white distilled vinegar) to approximately 11.4 kg (25.2 pounds, lb) of hot water) at about 40.5° C. (105° to 110° F.) were slowly added to the hot milk with mild agitation. The pH of the curd-whey mixture in the vat was 4.4. Visible coagulation of the milk occurred at pH of about 5.1. The process of acid addition was completed within 10 minutes. The temperature of the curd-whey mixture in the vat at this stage was about 75°–80° C. (167°–176° F.) where it was held for about 10 minutes under quiescent conditions, with the vat covered. Then, the vat was uncovered and a strainer was placed into the drain opening, and the valve was opened to drain whey. Simultaneously, the hot water in the jacket was drained. After draining most of the whey, the curd was trenched for complete whey removal. Generally, it took about 15 minutes for complete whey drainage. Cold city water was circulated through the jacket to cool the curd. Salt (224 g) was then mixed into the curd in three applications (about 75 g per application) at time intervals of about 3–4 minutes between applications. At the initial application of salt, the curd ceased to expel whey. The salted curd was hooped into 20-lb Wilson-style stainless steel hoops and pressed at 40 psi in a horizontal hydraulic press for 30 minutes. The hoop was removed from the press and placed in a freezer at −7° to −10° C. (19°–14° F.) for 1.5 hours to rapidly cool the curd to about 27° C. (80° F). From the freezer the hoop was placed in a cold room maintained at 7° C. (45° F.) where it was kept overnight. Then the cheese was removed from the hoop, vacuum-packaged and stored at 7° C. (45° F.) for consumption. Table 9 shows the yield and composition of cheese.

TABLE 9

Typical composition and yield of cheese.

| Component | Cheese |
| --- | --- |
| Moisture | 49.5% |
| Protein | 21.43% |
| Fat | 17.6% |
| Salt | 1.91% |
| pH | 5.4 |
| Yield | 14.5% |

The whey tested 5.5% total solids and 0.29% protein (Kjeldahl nitrogen×6.38).

EXAMPLE VIII

This example illustrates the preparation of Jalapeno pepper and red pepper flavored cheese with annatto color. One hundred and sixty-two pounds (73.5 kg) of milk (containing 3.0% fat, 3.5% protein, and 12.40% total solids, and having pH 6.7), was weighed into a 50-gallon capacity stainless steel, water-jacketed vat. Annatto food color (16.2 ml) was added. Calcium chloride (19.14 g) was dissolved in about 40 mL hot (95° C. or 203° F.) distilled water and stirred into the milk. The jacket was filled with cold water to approximately the level of milk in the vat. Steam at 15 to 20 psi was injected slowly into the jacket to raise the temperature of the milk to 85° C. (185° F.) over one hour. Table 10 illustrates the incremental heating scheme:

TABLE 10

Heating scheme of milk.

| Time (min) | Temperature |
| --- | --- |
| 0.00 | 15.5° C. (60° F.) |
| 10.00 | 32.2° C. (90° F.) |
| 20.00 | 51.6° C. (125° F.) |
| 30.00 | 65.6° C. (150° F.) |
| 40.00 | 73.8° C. (165° F.) |
| 50.00 | 79.4° C. (175° F.) |
| 60.00 | 85.0° C. (185° F.) |
| 90.00 | 85.0° C. (185° F.) |

The milk was held at 85° C. (185° F.) for 30 minutes. Then, 11 liters of a 2% solution of acetic acid (prepared by adding 582.5 mL of food-grade acetic acid (300 grain white distilled vinegar) to approximately 11.4 kg of hot water) at about 40.5° C. (105° to 110° F.) were slowly added to the hot milk with mild agitation. The juice from the pepper was added to the diluted acid. The pH of the curd-whey mixture in the vat was 4.4. Visible coagulation of the milk began at pH of about 5.1. The process of acid addition was completed within 10 minutes. The temperature of the curd-whey mixture in the vat at this stage was about 75°–80° C. (167°–176° F.) where it was held for about 10 minutes under quiescent conditions, with the vat covered. Then, the vat was uncovered and a strainer was placed into the drain opening, and the valve was opened to drain whey. Simultaneously, the hot water in the jacket was drained. After draining of most of the whey, the curd was trenched for complete whey removal. Generally, it took about 15 minutes for complete whey drainage. Cold city water was circulated through the jacket to cool the curd. Salt (224 g) was then mixed into the curd in three applications (about 75 g per application) at time intervals of about 3–4 minutes between applications. Chopped Jalapeno pepper (18 lb) and red pepper (18 lb) were added and mixed into the curd. At the initial application of salt, the curd ceased to expel whey. The salted curd was hooped into 20-lb Wilson-style stainless steel hoops and pressed at 40 psi in a horizontal hydraulic press for 30 minutes. The hoops were removed from the press and placed in a freezer at −7° to −10° C. (19°–14° F.) for 1.5 hours to rapidly cool the curd to about 27° C. (80° F.). From the freezer the hoops were placed overnight in a cold room at 7° C. (45° F.). Then, the cheese was removed from the hoop, vacuum-packaged and stored at 7° C. (45° F.) for consumption.

EXAMPLE IX

This example illustrates the preparation of basil and red pepper flavored cheese. One hundred and sixty-two pounds (73.5 kg) of milk (containing 3.0% fat, 3.5% protein, and 12.40% total solids, and having pH 6.7), was weighed into a 50-gallon capacity stainless steel, water-jacketed vat. Calcium chloride (19.14 g) was dissolved in about 40 mL hot (95° C. 203° .F)) distilled water and stirred into the milk. The jacket was filled with cold water to approximately the level of milk in the vat. Steam at 15 to 20 psi was injected slowly into the jacket to raise the temperature of the milk to 85° C. (185°) over one hour. Table 11 illustrates the incremental heating scheme:

TABLE 11

Heating scheme of milk.

| Time (min) | Temperature |
| --- | --- |
| 0.00 | 15.5° C. (60° F.) |
| 10.00 | 32.2° C. (90° F.) |
| 20.00 | 51.6° C. (125° F.) |
| 30.00 | 65.6° C. (150° F.) |
| 40.00 | 73.8° C. (165° F.) |
| 50.00 | 79.4° C. (175° F.) |
| 60.00 | 85.0° C. (185° F.) |
| 90.00 | 85.0° C. (185° F.) |

The milk was held at 85° C. (185° F.) for 30 minutes. Then, 11 liters of a 2% solution of acetic acid (prepared by adding 582.5 mL of food-grade acetic acid (300 grain white distilled vinegar) to approximately 11.4 kg of hot water) at about 79.5° C. (175° F.) were slowly added to the hot milk with mild agitation. The pH of the curd-whey mixture in the vat was 4.4. Visible coagulation of the milk occurred at pH of about 5.1. The process of acid addition was completed within 10 minutes. The temperature of the curd-whey mixture in the vat at this stage was about 75°–80° C. (167°–176° F.) where it was held for about 10 minutes under quiescent conditions, with the vat covered. Then, the vat was uncovered and a strainer was placed into the drain opening, and the valve was opened to drain whey. Simultaneously, the hot water in the jacket was drained. After draining of most of the whey, the curd was trenched for complete whey removal. Generally, it took about 15 minutes for complete whey drainage. Cold city water was circulated through the jacket to cool the curd. Salt (224 g) was then mixed into the curd in three applications (about 75 g per application) at time intervals of about 3–4 minutes between applications. About one-half lb dry basil was boiled in 2 L distilled water. The water used to boil the basil was included as part of the acid dilution water. The basil was removed and the water was used to dilute the acid. The boiled basil was mixed with one-half lb red pepper, and the mixture was added to the salted curd. At the initial application of salt, the curd ceased to expel whey. The salted curd was hooped into 20-lb Wilson-style stainless steel hoops and pressed at 40 psi in a horizontal hydraulic press for 30 minutes. The hoops were removed from the press and placed in a freezer at −7° to −10° C. (19°–14° F.) for 1.5 hours to rapidly cool the curd to about 27° C. (80° F.). From the freezer the hoops were placed overnight in a cold room at 7° C. (45° F.). Then, the cheese was removed from the hoop, vacuum-packaged and stored at 7° C. (45° F.) for consumption.

EXAMPLE X

The example illustrates cheese making from homogenized milk. One hundred and sixty-two pounds (73.5 kg) of milk (containing 3.0% fat, 3.5% protein, and 12.40% total solids, and have pH 6.7), was weighed into a 50-gallon capacity stainless steel, water-jacketed vat. The milk was homogenized in a double stage homogenizer at 2000 psi second stage and 500 psi first stage. Calcium chloride (19.14 g) was dissolved in about 40 mL hot (95° C. (203° F.)) distilled water and stirred into the milk. The jacket was filled with cold water to approximately the same level of milk in the vat. Steam at 15 to 20 psi was injected slowly into the jacket to raise the temperature of the milk to 85° C. (185° F.) over one hour. Table 12 illustrates the incremental heating scheme:

TABLE 12

Heating scheme of milk.

| Time (min) | Temperature |
| --- | --- |
| 0.00 | 15.5° C. (60° F.) |
| 10.00 | 32.2° C. (90° F.) |
| 20.00 | 51.6° C. (125° F.) |
| 30.00 | 65.6° C. (150° F.) |
| 40.00 | 73.8° C. (165° F.) |
| 50.00 | 79.4° C. (175° F.) |
| 60.00 | 85.0° C. (185° F.) |
| 90.00 | 85.0° C. (185° F.) |

The milk was held at 85° C. (185° F.) for 30 minutes. Then, 11 liters of a 2% solution of lactic acid (prepared by adding 272.76 mL of food-grade 88% heat stable lactic acid to approximately 25.85 pounds of hot water) at about 73.8° C. (165° F.) were slowly added to the hot milk with mild agitation. The pH of the curd-whey mixture in the vat was 4.4. Visible coagulation of the milk occurred at pH of about 5.1. The process of acid addition was completed within 10 minutes. The temperature of the curd-whey mixture in the vat at this stage was about 75°–80° C. (167°–176° F.) where it was held for about 10 minutes under quiescent conditions, with the vat covered. Then, the vat was uncovered and a strainer was placed into the drain opening, and the valve was opened to drain whey. Simultaneously, the hot water in the jacket was drained. After draining of most of the whey, the curd was trenched for complete whey removal. Generally, it took about 20 minutes for complete whey drainage. Cold city water was circulated through the jacket to cool the curd. Salt (260 g) was then mixed into the curd in three applications (about 75 g per application) at time intervals of about 3–4 minutes between applications. At the initial application of salt, the curd ceased to expel whey. The salted curd was hooped into 20-lb Wilson-style stainless steel hoops and pressed at 40 psi in a horizontal hydraulic press for 40 minutes. The hoops were removed from the press and placed in a freezer at −7° to −10° C. (19°–14° F.) for 1.5 hours to rapidly cool the curd to about 27° C. (80° F). From the freezer the hoops were placed overnight in a cold room at 7° C. (45° F.). Then, the cheese was removed from the hoop, vacuum-packaged and stored at 7° C. (45° F.) for consumption. Table 13 shows the yield and composition of cheese.

TABLE 13

Typical composition and yield of cheese.

| Component | Cheese |
| --- | --- |
| Moisture | 52.6% |
| Protein | 21.4% |
| Fat | 17.5% |
| Salt | 1.91% |
| pH | 5.44 |
| Yield | 15.8% |

The whey tested 5.60% total solids and 0.22% protein (Kjeldahl nitrogen×6.38).

EXAMPLE XI

To 162 lb (73.5 kg) of milk (containing 3.0% fat, 3.5% protein, and 12.40% total solids, and having pH 6.7) were added 1% (1.6 lb) of enzyme-modified cheese product(s) (e.g., Cheddar, Romano or Parmesan) in a 50-gallon capacity stainless steel, water-jacketed vat. Calcium chloride (19.14 g) was dissolved in about 40 mL hot (95° C. or 203° F.) distilled water and stirred into the flavored milk. The jacket was filled with cold water to approximately the same level as the contents of the vat. Steam at 15 to 20 psi was injected slowly into the jacket to raise the temperature of the contents of the vat to 85° C. over one hour. Tabe 14 illustrates the incremental heating scheme:

TABLE 14

Heating scheme of milk.

| Time (min) | Temperature |
| --- | --- |
| 0.00 | 15.5° C. (60° F.) |
| 10.00 | 32.2° C. (90° F.) |
| 20.00 | 51.6° C. (125° F.) |
| 30.00 | 65.6° C. (150° F.) |
| 40.00 | 73.8° C. (165° F.) |
| 50.00 | 79.4° C. (175° F.) |
| 60.00 | 85.0° C. (185° F.) |
| 90.00 | 85.0° C. (185° F.) |

The flavored milk was held at 85° C. (185° F.) for 30 minutes. Then, 11 liters of a 2% solution of acetic acid (prepared by adding 582.5 mL of food-grade acetic acid (300 grain white distilled vinegar) to approximately 11.4 kg of hot water at about 79.5° C. (175° F.) were slowly added to the hot flavored milk with mild agitation. The pH of the curd-whey mixture in the vat was 4.4. Visible coagulation of the flavored milk occurred at pH of about 5.1. The process of acid addition was completed within 10 minutes. The temperature of the curd-whey mixture in the vat at this stage was about 75°–80° C. (167°–176° F.) where it was held for about 10 minutes under quiescent conditions, with the vat covered. Then, the vat was uncovered and a strainer was placed into the drain opening, and the valve was opened to drain whey. Simultaneously, the hot water in the jacket was drained. After draining of most of the whey, the curd was trenched for complete whey removal. Generally, it took about 15 minutes for complete whey drainage. Cold city water was circulated through the jacket to cool the curd. Salt (224 g) was then mixed into the curd in three applications (about 75 g per application) at time intervals of about 3–4 minutes between applications. At the initial application of salt, the curd ceased to expel whey. The salted curd was hooped into 20-lb Wilson-style stainless steel hoops and pressed at 40 psi in a horizontal hydraulic press for 40 minutes. The hoops were removed from the press and placed in a freezer at −7° to −10° C. (19°–14° F.) for 1.5 hours to rapidly cool the curd to about 27° C. (80° F). From the freezer the hoops were placed overnight in a cold room at 7° C. (45° F.). Then, the cheese was removed from the hoop, vacuum-packaged and stored at 7° C. for consumption.

Examples of Some Applications

1. Boiling:

Five cubes (2 cm×2 cm×2 cm) of cheese were placed in one liter of water or 1.5% solution of NaCl, in a stainless steel container, and heated to boiling (100° C. (212° F.)) for zero to 5 min. Observation of the cheese during boiling and after boiling showed the cheese intact. On the contrary, Cheddar cheese samples subjected to the same treatment melted. The moisture content of the boiled cheese ranged from 47 to 53% depending on the duration of boiling. The fat level of the cheese ranged from 16 to 18%. Based on its water absorption properties, the cheese could be used in soups, stews, casserole, etc.

2. Deep-fat Frying:

Several cubes of the cheese were placed in hot soy bean (or other vegetable) oil at 145° to 195° C. (369° to 375° F.) in an enclosed rotary deep fryer for 0 to 5 min. Observation of the cheese during frying and after frying showed intact cheese whereas samples of Cheddar, Monterey Jack and Mozzarella melted in the hot oil. The surface of the cheese browned during frying and was free of blisters. The moisture content of the deep fried homogenized milk cheese ranged from 34 to 45%, depending on the duration of frying. Similarly, the moisture content of the non-homogenized milk cheese ranged from 32 to 45%, depending on the duration of frying. Table 15 illustrates the changes in moisture and fat content of the cheese during frying.

TABLE 15

Changes in moisture and fat content during frying of cheese made from homogenized or non-homogenized milk.

| Duration of frying | Percent moisture in homogenized milk cheese | Percent moisture in non-homogenized milk cheese |
| --- | --- | --- |
| 1 min | 45–52 | 45–47 |
| 3 min | 39–42 | 38–44 |
| 5 min | 34–36 | 32–36 |

| Duration of frying | Percent fat in homogenized milk cheese | Percent fat in non-homogenized milk cheese |
| --- | --- | --- |
| 1 min | 17–22 | 19–20 |
| 3 min | 25–26 | 24–25 |
| 5 min | 29–30 | 26–29 |

3. Pan Frying:

Samples of the cheese were placed in soy bean (or other vegetable) oil in a frying pan over heat for up to 10 min. Observation of the cheese showed intact cheese whereas samples of Cheddar, Monterey Jack and Mozzarella melted in the pan.

4. Sterilization:

Samples of the cheese were placed in water in a clear, heat-resistant, wide-mouth bottle. The bottle and its contents were heated in an autoclave at 121° C. for 15 min to simulate sterilization. The cheese remained intact after the bottle was removed from the autoclave.

5. Retort/Canning:

Samples of the cheese (15 cubes) were placed in water or 1.5% salt solution and in a double-seam number 303 can; with a head space of six-sixteenths of an inch and retorted at 250° F. at 18 psi for up to 2 hours. The can(s) were opened after cooling and the cheese was found intact, with no deformation. Browning increased with retort time. The moisture content of the cheese increased from 48.5 to 51% after retorting.

6. Microwaveability:

Samples of the cheese were placed in a conventional microwave on hi- or low power for up to 5 min. The cheese browned but did not melt whereas samples of Cheddar treated alike melted.

7. Extrusion Cooking:

Samples of grated cheese were blended with cereal flour and other flavorings, if desired. The amount of cheese in the blend varied from 5 to 25%. The mixture is tempered for 15 min to about 24 hours, then fed into a single-screw extruder. The feed rate was 35 to 40 rpm. The cooking temperature in the extruder was raised from 30° to 200° F. and the pressure is raised between 800 and 1600 psig. The screw speed was between 100 to 300 rpm. The mixture expanded about 3.5 to 5 times upon extrusion. The expanded product was cut at the die to provide pieces of various sizes. The amount of cheese in the final product depends on the amount of cheese originally used. For a cereal-cheese mixture containing 10% cheese, the moisture content of the extrudate was about 18%.

8. Baking:

Samples of the cheese were chopped and blended with chopped dates, seedless raisins, chopped almonds and wheat germ. The ingredients were mixed together and then a syrup or honey was poured onto the ingredients to coat evenly. Press into a square baking pan and bake at 350° C. for 30 minutes until golden brown. Cool for 30 min, and cut into bars.

Although illustrative embodiments of the invention have been described, however, it is to be understood that various modifications and substitutions may be made by those skilled in the art without departing from the novel spirit and scope of the present invention.

What is claimed is:

1. A heat-stable cheese comprising about 48–55% moisture, about 20–22% protein, about 300–600 milligrams calcium per 100 grams cheese, about 18–21% fat and having a pH of about 5.1–5.5 produced by adding acid directly to milk to form a curd and then removing the whey.

2. The cheese of claim 1 comprising about 51–53% moisture.

3. The cheese of claim 1 comprising about 19–21% fat.

4. The cheese of claim 1 comprising about pH 5.2.

5. The cheese of claim 1 further comprising a colorant.

6. The cheese of claim 5 where in the colorant is annatto.

7. The cheese of claim 1 further comprising a flavor agent.

8. A cheese in accordance with claim 1 which will not melt at temperatures below about 400° F.

9. A cheese comprising about 48–55% moisture, about 20–22% protein, about 300–600 milligrams calcium per 100 grams cheese, about 18–21% fat and having a pH of about 5.1–5.5 which will not melt at temperatures below about 400° F. produced by adding acid directly to milk to form a curd and then removing the whey.

10. The cheese of claim 9 further comprising a colorant.

11. The cheese of claim 10 wherein the colorant is annatto.

12. The cheese of claim 9 further comprising a flavor agent.

13. A food containing a heat-stable cheese comprising about 48–55% moisture, about 20–22% protein, about 300–600 milligrams calcium per 100 grams cheese, about 18–21% fat and a pH of about 5.1–5.5 produced by adding acid directly to milk to form a curd and then removing the whey.

14. A food made from a heat-stable cheese produced by acidifying milk to form a curd and by removing the whey with about 48–55% moisture, about 20–22% protein, about 300–600 milligrams calcium per 100 grams cheese, about 18–21% fat and a pH of about 5.1–5.5 produced by adding acid directly to milk to form a curd and then removing the whey.

* * * * *